US007900149B2

(12) United States Patent
Hatcher et al.

(10) Patent No.: US 7,900,149 B2
(45) Date of Patent: Mar. 1, 2011

(54) METHODS AND SYSTEMS FOR EDITING OF WEB PAGES IN AN APPLICATION CAPABLE OF DISPLAYING WEB PAGE CONTENT

(75) Inventors: Timothy Gene Hatcher, San Jose, CA (US); David Frank Harrison, Boulder Creek, CA (US); Scott James Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 726 days.

(21) Appl. No.: 11/924,548

(22) Filed: Oct. 25, 2007

(65) Prior Publication Data

US 2008/0307328 A1 Dec. 11, 2008

Related U.S. Application Data

(60) Provisional application No. 60/933,777, filed on Jun. 8, 2007.

(51) Int. Cl.
*G06F 3/00* (2006.01)

(52) U.S. Cl. .......... 715/760; 715/733; 715/744; 715/234

(58) Field of Classification Search .................. 715/744, 715/752, 760, 733, 764, 765, 810, 205, 234
See application file for complete search history.

(56) References Cited

U.S. PATENT DOCUMENTS

| 7,050,079 | B1 * | 5/2006 | Estrada et al. ................. 715/760 |
| 7,536,641 | B2 * | 5/2009 | Rosenstein et al. ............ 715/234 |
| 7,584,268 | B2 * | 9/2009 | Kraus et al. .................... 709/218 |
| 2001/0054078 | A1 * | 12/2001 | Buckner et al. ............... 709/206 |
| 2006/0047547 | A1 * | 3/2006 | Ekker et al. ........................ 705/8 |

* cited by examiner

*Primary Examiner* — Xiomar Bautista
(74) *Attorney, Agent, or Firm* — Blakely, Sokoloff, Taylor & Zafman LLP

(57) ABSTRACT

Editing of blocks of web page content from within an integrated application capable of displaying a web page. An algorithm based on both the element and the element format is applied to identify a qualifying block to which a user's input is directed. The heuristic applied to identify such a block is designed to select enough content that a minimal number of user inputs are required without selecting so much content that the user is unable to retain desirable portions of the web page. Then, to facilitate an easy way of editing the web page content, a visual option is displayed for selection by the user to perform an operation (deleting, copying, etc.) on the block. The visual option can be a button, an image, or a menu option.

25 Claims, 12 Drawing Sheets

METHODS AND SYSTEMS FOR EDITING OF WEB PAGES IN AN APPLICATION CAPABLE OF DISPLAYING WEB PAGE CONTENT

CROSS REFERENCE TO RELATED APPLICATIONS

This application claims the benefit of U.S. Provisional Application No. 60/933,777, filed Jun. 8, 2007, hereby incorporated by reference.

TECHNICAL FIELD

This invention relates to methods and systems for editing of blocks of a web page in an email application.

BACKGROUND

A web page or webpage is a resource of information that is suitable for the World Wide Web and can be accessed through a web browser (e.g., Safari®, etc.) Web page content may be created by using Hyper Text Markup Language (HTML) or rich HTML.

HTML uses tags to mark elements (e.g., text and graphics) in a document to provide a layout for displaying the content to web browsers. HTML elements are constructed with: 1) a start tag marking the beginning of an element; 2) any number of attributes; 3) some amount of content (characters and other elements); and 4) an end tag. A web page's content is usually organized by a number of block elements and inline elements. Block elements, or "blocks" are relatively large structures containing other blocks, inline elements, or text. They are usually displayed as independent blocks separated from other blocks by vertical spaces or margins. A block contains a logical set of data, such as a paragraph of text, an image, a group of radio buttons, a list, a table, etc.

FIG. 1A shows a web page 100 including a number of blocks 101-105. As shown, the web page 100 includes a header 101, a side navigation bar 102, an image 103, a paragraph of text 104, and footer 105. Each of the different portions 101-105 of the web page is considered as a block that defines an area of the web page and organizes a set of data. As shown, some of the blocks (such as 102 and 103) have borders that visually indicate to a user that they are blocks. However, some of the blocks (such as 101, 104, and 105) do not have borders that visually indicate to a user that they are blocks.

FIG. 1B shows HTML code that defines a number of blocks. As shown, blocks 110, 112, and 113 are defined by the tags "<p>" and "</p>." Block 111 is defined by the tags "<div>" and "</div>." Blocks can be nested. For example, blocks 112 and 113 are both contained within block 111.

Various web page editors are available to help a user to visually edit a web page (e.g., adding content, deleting content, etc.) A web page editor is typically a stand alone application. Though it may be integrated with other applications, a conventional web page editor requires a number of processing modules and a significant amount of processing overhead making it cumbersome to integrate. Furthermore, web page editors are generally designed for the purpose of constructing web pages and therefore have features and processes which generally do not lend themselves to the tasks a user typically wishes to perform from within many other applications, such as an email application. For these reasons, limiting web editing capability designed specifically for integration into other applications, such as an email client, is desirable.

Also, according to conventional web editor techniques, in order to delete or copy a block in a web page editor, a user needs to input, typically with a mouse pointer, a selection of the desired block. However, because a block may not have a visible border that visually defines the block for the user and given the high density of blocks in modern web pages, it may be difficult for a user to operate the mouse pointer to select the desired block rather than a neighboring block even. Thus, an easy way of selecting a block for operations like deleting and copying is desirable.

SUMMARY

A method for editing blocks of a web page is disclosed. In one embodiment, the editing of markup language content, such as that used to display a web page, is provided by software modules which are part of, or called by, a client application, such as an HTML or Extensible Markup Language (XML) capable email software program. These software modules can render a display of the web page and operate as described below to allow the user to edit the web page and then, in the case of the exemplary email client application, send the edited web page as a portion of an email message.

In one aspect, the web page editing capability is designed for easy implementation and seamless integration into the client application. The user interface and the capabilities target the activities of the integrated client application user rather than a web page designer. This limits the processing overhead and reduces the complexity of the interface to the benefit of the integrated client application user. A feature-rich application may be provided without incurring a significant learning curve penalty. In one embodiment, the webpage editing capability and user interface are directed toward deconstructing a web page from within a client application view, such as an email message editing window. In one email client embodiment, deconstruction of a web page may be done with an intuitive interface to enable the email user to simplify markup language content included in an email, direct the attention of the email message recipient, remove confidential information prior to emailing, reduce email message file size, etc.

In another aspect, the method includes determining to which web page block a user's input is directed. For example, based on a user's input identifying HTML content, the process applies a heuristic to determine the block that the user most likely desires to edit. In one embodiment, the heuristic applies criteria to both the render object and the Document Object Model (DOM) element in determining to which block a user's input is directed. In a specific embodiment, the heuristic includes identifying the render object containing a portion of the HTML identified by a user's input, determining, from a DOM tree, the corresponding DOM element, traversing the DOM tree in search for particular elements which have certain visual characteristics making them a likely target of the user's input, and then further determining if a candidate element is of a sufficient size. The heuristic applied to identify a qualifying element (i.e. qualifying block) is designed to select enough content that a minimal number of user inputs are required, while avoiding selection of so much content that the user is unable to retain desirable portions of the web page.

In another aspect, after determining a qualifying block, to facilitate an easy way of editing the HTML content, the block is visually identified in a display screen view presented to the user. In one embodiment, a highlighted box is displayed around the perimeter of the block. In a further embodiment, an HTML editing interface having user-selectable editing options for editing the block is displayed. In a specific example the highlighted box and the editing interface are both presented to the user within an email message display window. The display of the editing options may be in the form of a screen widget.

In another aspect, upon selection of the editing option from the HTML editing interface, the processing system performs the edit on the block. In one embodiment, the editing operation deletes the highlighted block, allowing the user to edit or reduce the HTML content to be sent in the email message. Once edited, the web page can be sent as an email or an attachment to an email.

DETAILED DESCRIPTION

Described herein are methods and systems for providing a user interface for web page editing, certain embodiments of which have characteristics particularly well-suited for integration into an integrated client application, such as an email message editor. In the following description, numerous specific details are set forth. However, it is understood that embodiments may be practiced without these specific details. For example, well known equivalent components may be used in place of those described herein. In other instances, well known components have not been shown in detail in order not to obscure the understanding of this description.

Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2007.

Figure 2:
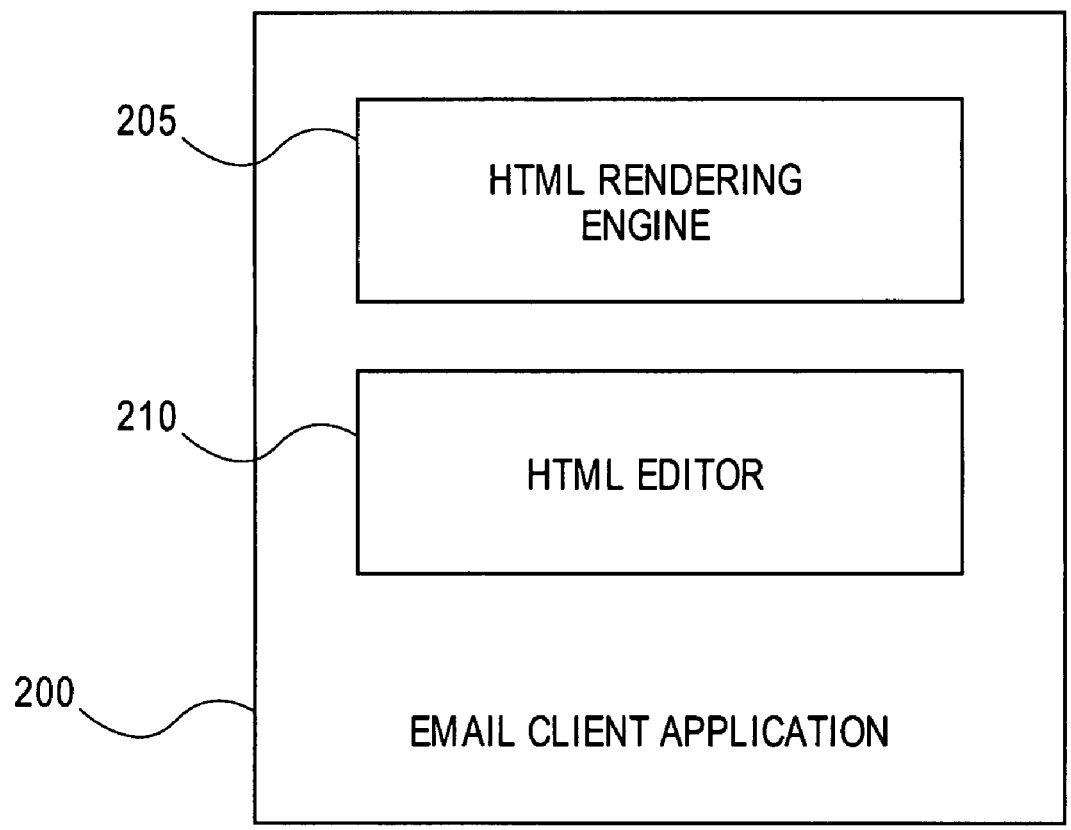
FIG. 2 shows a block diagram of modules in an email client application in accordance with an embodiment of the present invention.

FIG. 2 shows a block diagram of an exemplary email client application 200 which may implement aspects of the present invention. Although, many aspects and advantages of the present invention are described in the context of the exemplary email client application 200, it should be appreciated any other integrated client application capable of displaying web page content, such as a spreadsheet application or word processing application, may also implement aspects of the present invention.

As shown, email client application 200 includes, or has access to, an HTML rendering engine 205 enabling HTML content to be displayed in-line as email messages. It should be appreciated the present invention may readily be adapted to other markup languages, such as XML, in place of or in combination with the exemplary HTML embodiments described. HTML rendering engine 205 may be based on any commonly known in the industry, such as, but not limited to, the WebKit application framework, commercially available from Apple, Computer, Inc. of Cupertino, Calif. Email client application 200 further includes, or has access to, an HTML editor 210 to allow the user to interact with the HTML content included within an email message displayed in a view of the email client application 200. The HTML rendering engine 205 and the HTML editor 210 may perform processes exposed to one another to determine a block of HTML to be edited in response to a user's input identifying a displayed portion of HTML content from within a view of an email message, to visually identify the determined block within the display of the email message, provide an editing interface to the user, and perform the editing of the HTML content as directed by the user.

Figure 3:
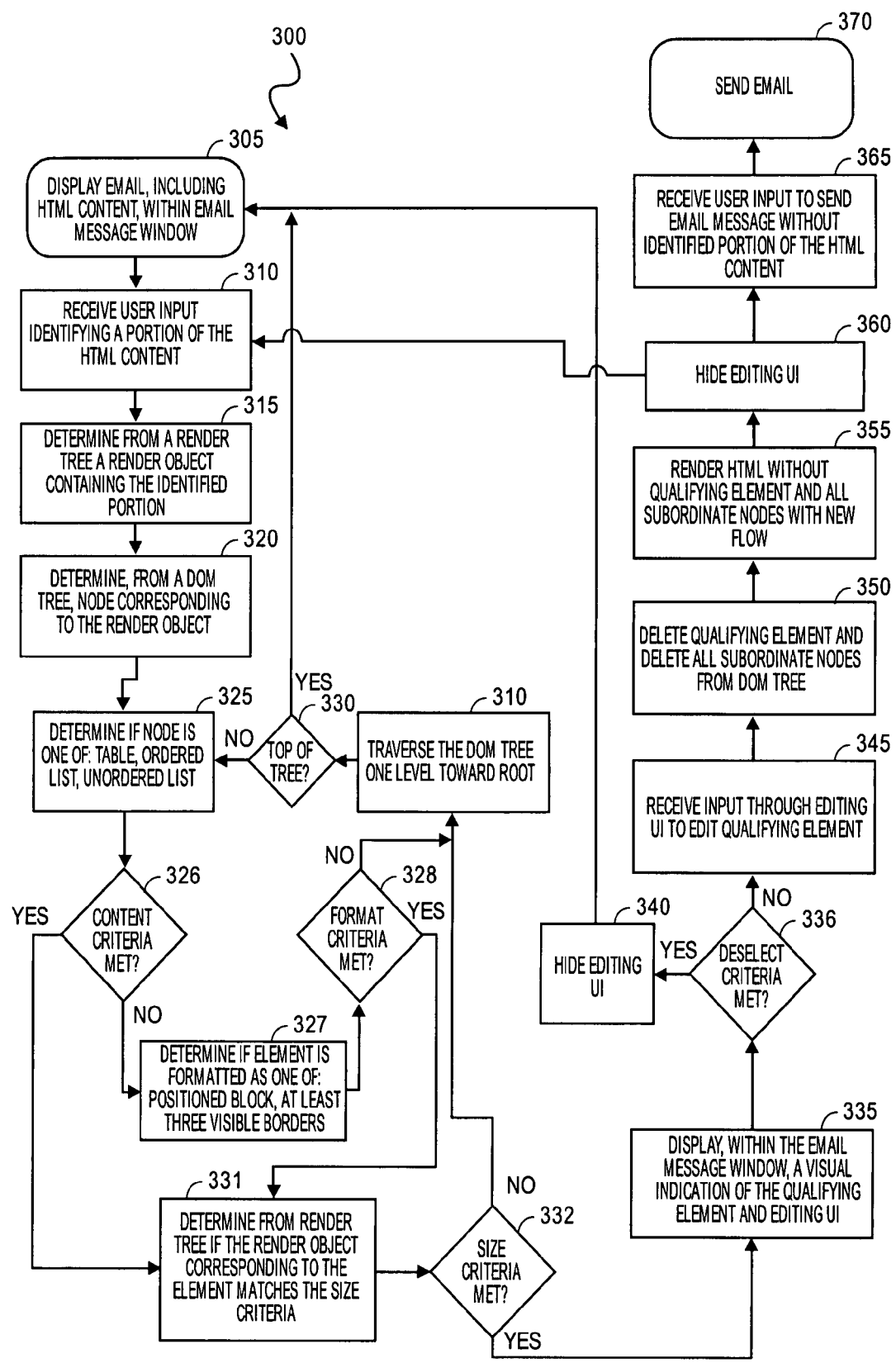
FIG. 3 is a flow diagram illustrating an exemplary process for selecting and editing a block of HTML content in an email message, according to an embodiment of the present invention.
Figure 4:
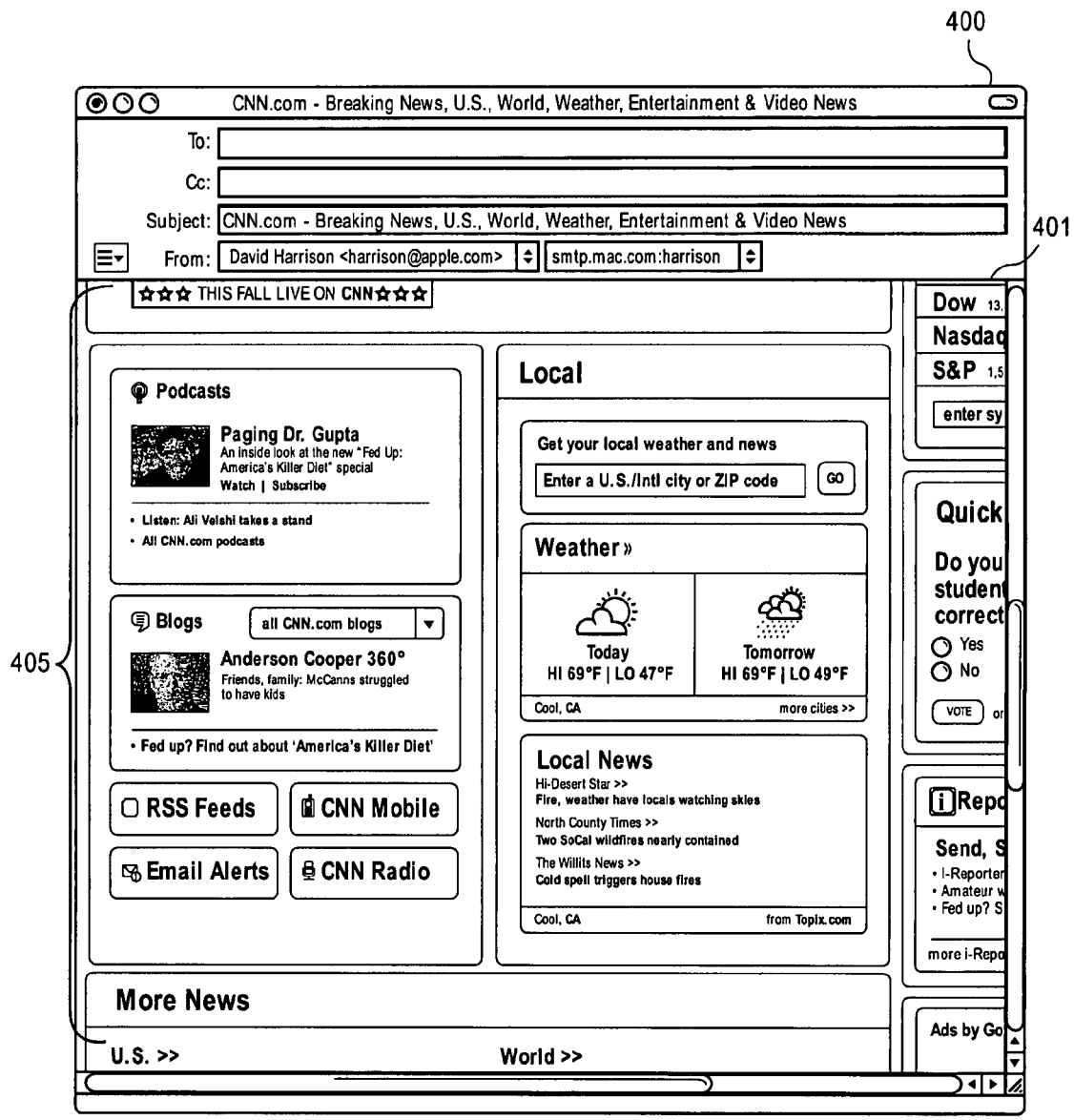
FIG. 4 shows an exemplary user interface which may be used to create an email message containing HTML content, according to an embodiment of the present invention.

FIG. 3 is a flow diagram illustrating an exemplary process for selecting and editing a block of web page content in an email message. The exemplary process 300 begins at operation 305 with the email client application 200 displaying to a user a body of an email message, the email message body including mark-up language content. Alternatively, the mark-up language content could be in the form of an attachment to the email and displayed to the user in a separate attachment view. FIG. 4 shows an exemplary user interface of an email editor window 400 which may be used to create an email message containing the mark-up language content. As shown, the email editor window 400 includes a sub-window or body frame 401 for displaying the body of the email message.

Within the body frame 401 is displayed mark-up language content, such as HTML content in the form of a web page 405.

Figure 5A:
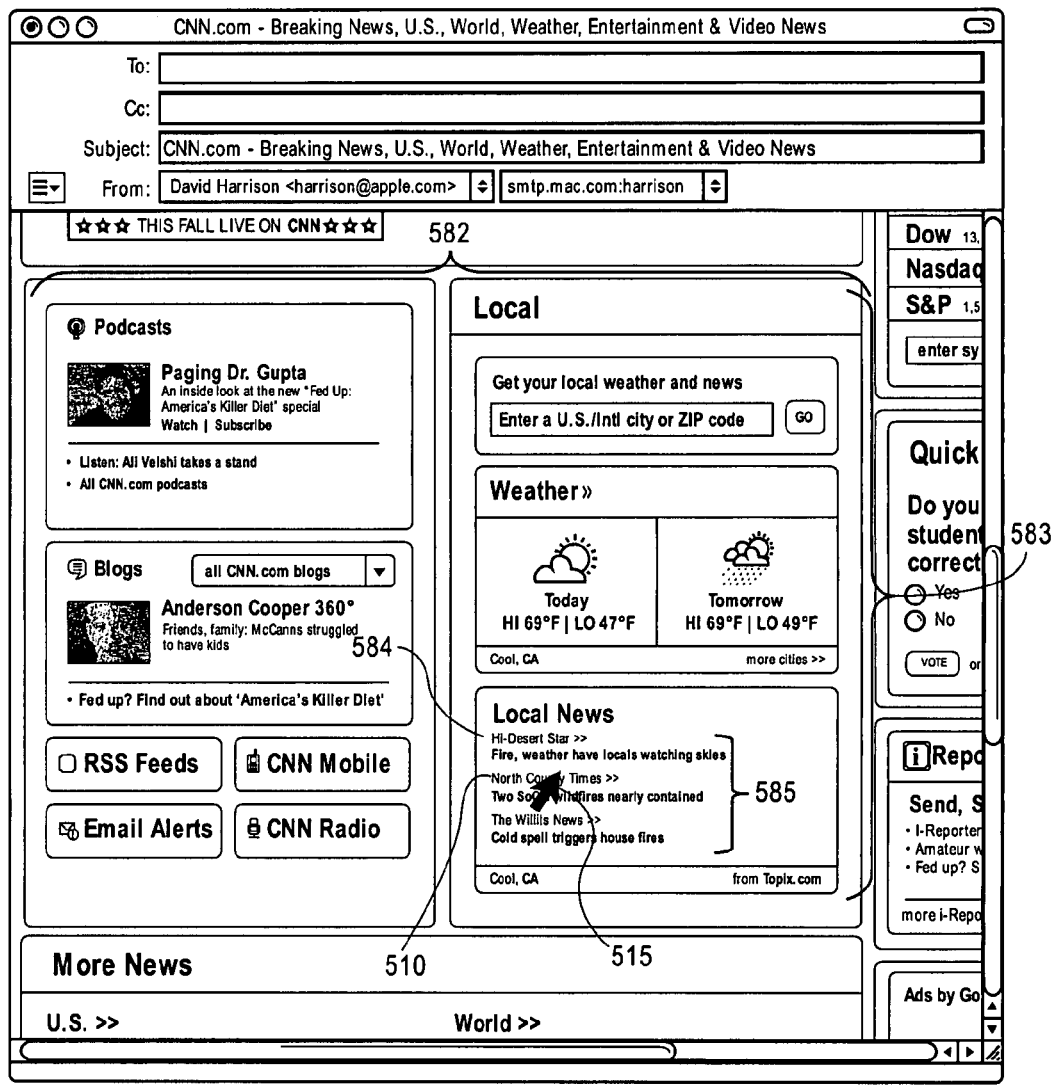
FIG. 5A shows an exemplary user interface which may be used to select a portion of HTML content from within an email message display, according to an embodiment of the present invention.

At operation 310, the processing system receives input identifying a portion of the HTML content, such as the target content 510 in web page 405, shown in FIG. 5A. Identification may be by any commonly employed means, such as a mouse pointer 515 or a key-stroke sequence. In an embodiment, the input is with a mouse button click while mouse pointer 515 is over the target content 510, which may or may not cause a cursor to appear on the target HTML content 510. In another embodiment, the input causes the target HTML content 510 to be highlighted, such as with a click-and-drag input.

Figures 1A, 1B:
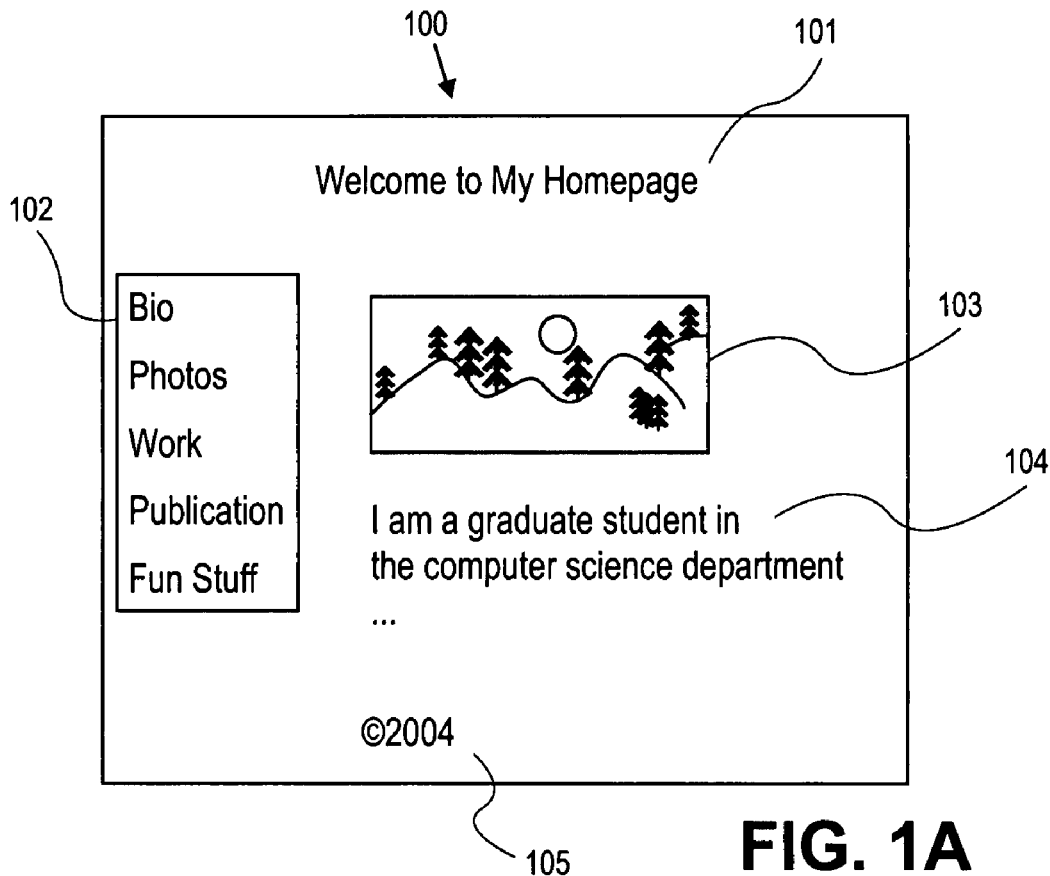
FIG. 1A shows a web page including a number of blocks.
FIG. 1B shows HTML code that defines a number of blocks.
Figure 5C:
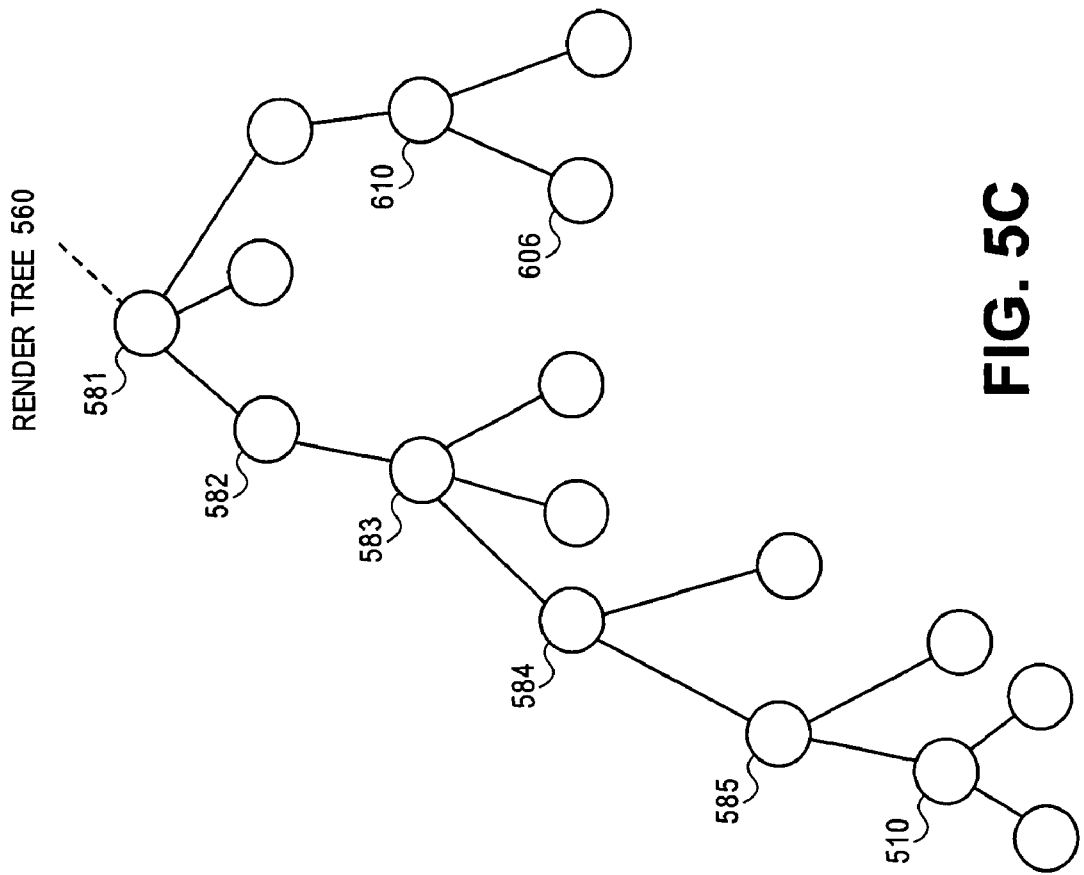
FIG. 5C shows an exemplary render tree which may be generated for the HTML content in the email message shown in FIG. 5A.
Figure 5B:
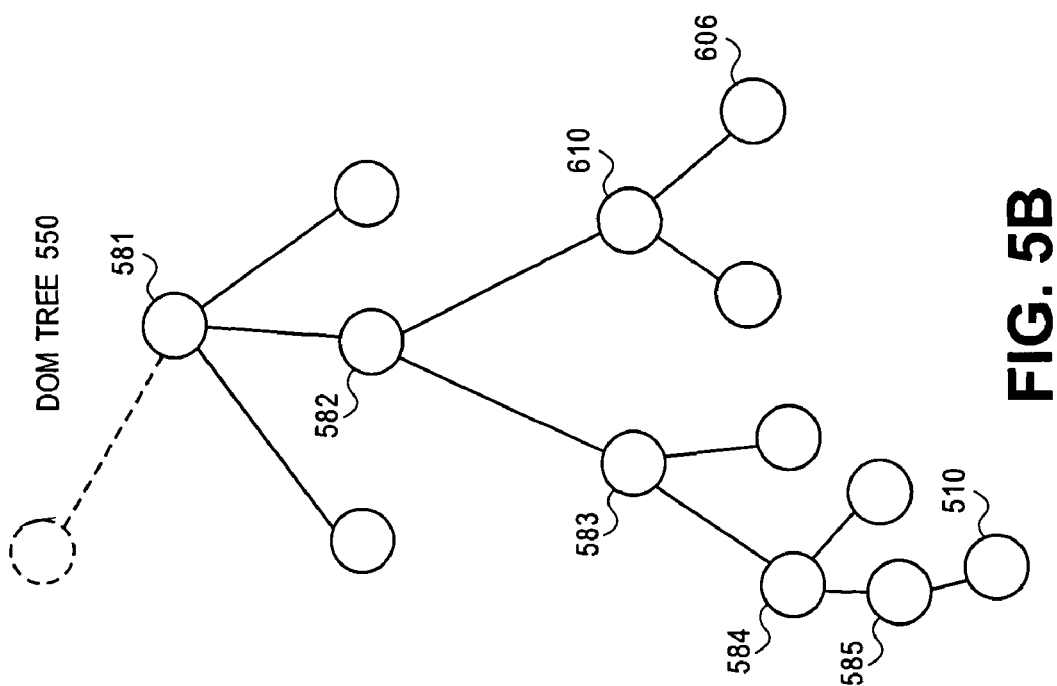
FIG. 5B shows an exemplary DOM tree which may be generated for the HTML content in the email message shown in FIG. 5A

After operation 310, the processing system determines content information about the web page 405 (e.g. from a DOM tree) and format information (e.g. from a render tree) for the web page 405. Based the HTML code, such as that shown in FIG. 1B, the content elements (blocks and inline) of the web page 405 are logically organized hierarchically in a Document Object Model (DOM), or DOM tree. An exemplary DOM tree is depicted as DOM tree 550 in FIG. 5B. As shown, the DOM tree is a representation of the document content decoupled from a screen display with each element placed on the DOM tree as a node. In the DOM tree 550, for illustrative purposes only, various nodes are labeled to correspond to exemplary blocks shown in FIG. 5A. For example, block 582 is a logical superset of the block 583 entitled "Local," therefore block 582 is depicted as dominant (i.e. a parent) to block 583 on the DOM tree 550. Similarly, block 584 "Local News" is a logical content subset of the block 583 and is therefore subordinate (i.e. a child) to block 583 on the DOM tree 550. The block 585 is thus also a logical content subset of the block 583. Finally, target content 510 is a logical content subset of block 585. Each of these blocks in the DOM tree hierarchy may be a block element or an inline, text-level element. Block elements include "headings," "unordered lists," "ordered lists," "tables" and "forms," etc. For example, blocks 582, 583 and 584 may be a DOM "table" elements, while block 585 may be a DOM "unordered list" or "ordered list" element and target content 510 may be inline text within a list block element.

A rendering engine, such as HTML rendering engine 205, processes the elements of the DOM tree along with element format information, such as from Cascading Style Sheets (CSS), and displays the content of the DOM tree on the screen as block containers according to flexible formatting rules dependent on a user's display, etc. An exemplary render tree generated by a render engine is depicted as render tree 560 in FIG. 5C. A render tree is a hierarchy of display format information corresponding to certain blocks of logical content information describing the web page document. While, the render tree contain additional objects that have no correspondence to the other. For example, a DOM tree may include hidden content that is not displayed, such as foreign language nodes, etc.

The render tree may include element format information such as, but not limited to, block display area, block padding, block border properties, and block positioning. The initial containing block of a render tree is sized to the viewport, such as the email body frame 401. Each block in the exemplary render tree 560, such as 581, 582, 583, 584, 585 and 510 may then be provided with height and width sizing based on the initial block of the render tree. The initial block is also positioned at (0,0) relative to the entire document. The subordinate container blocks (e.g. 581-585) can then be either positioned blocks or unpositioned blocks within the initial block. Unpositioned (i.e. static) blocks have no position specified and are therefore positioned according to the web page's normal flow. Typically, the default format for a block container is unpositioned, wherein elements will flow one after another in the same order as they appear in the HTML source code. Positioned blocks may further include absolute and relative positions. Absolute positioned objects are positioned relative to either the viewport (fixed) or a container block (absolute). Each block may further be provided with a relative position to fit in the content flow, if not based on the initial block of the render tree. Either the DOM tree or the render tree may further include information determining the appearance of borders on the block.

Returning to FIG. 3, the processing system performs operations 315 through 332 to identify elements on web page 405 that are likely to appear to the user as visually separable areas of web page content. The exemplary process 300 employs both content criteria and format criteria to make a determination to what element in the web page 405 the input received at operation 310 pertains. The exemplary search methodology and criteria applied for identifying such a "qualifying block" is designed to select enough content to enable a substantial quantity of web page content to be removed or otherwise edited by a user with a minimal number of user inputs, while avoiding auto-selection of so much content that the user is unable to retain desirable portions of the web page. It has been found certain embodiments employing search criteria having a hybrid of content criteria and format criteria are particularly advantageous for identifying an element or block on which the user wishes to operate.

At operation 315, the process determines from the render tree what render object corresponds to content identified by the user input, such as the target content 510 of FIG. 5A. This may be, for example, render object 510 on the render tree 560 shown in FIG. 5C. At operation 320, the process then determines, from a DOM tree, a node corresponding to the render object 510 identified in operation 315. This may be, for example, node 510 on DOM tree 550.

Next, at operation 325, the process begins a search for a node meeting either a content criterion or a format criterion. Generally the search may employ a sequential searching technique to locate a DOM node of interest. The technique may traverse the document and compare each of the nodes within the DOM data structure. In an embodiment, the search may begin at the node 510 and move toward the root of the DOM tree 550. At operation 325, the processing system determines if the node is a content element that is a table, an ordered list or an unordered list. If the node is one of these particular block content elements, then the content criterion is met at operation 326 and the process proceeds to operation 330.

In a further embodiment, the content criterion may be limited to a subset of the table, ordered list and unordered list blocks where the application itself may create such elements. For example, where email client application allows creation of a list element in the body of the email message, it may be advantageous to limit the search criteria of operation 325 so that the list created by the user in the body of the email does not satisfy the criteria at operation 326. In another embodiment, the process may make a distinction between a user-created list element placed in the body of the email and a list element imported into the body of the email message as part of a web page. Where such a distinction is made, the search operation 325 may retain each of the content criteria (table, ordered list and unordered list), even where the user may have also previously created such lists within the email. In the exemplary embodiment depicted in FIG. 5A, the target content 510 does not meet the criteria at operation 326.

Where a content criterion at operation 326 is not met, (e.g. the node is not a table, an ordered list or an unordered list) then the process determines, at operation 327, if the node format criteria is satisfied. In one embodiment, format criteria include a positioned block or a block having at least three visible borders. Both positioned blocks and blocks with at least three visible borders may be associated with blocks on which the user desires to operate. The process may determine such format information from style sheet properties applied in the render tree. A positioned block, as previously described, is one which is formatted with a position (i.e. not merely allowed to flow between a first block and a second block in the same order as the blocks appear in the HTML source). Because a positioned block may frequently contain images and other content to which a user's attention may be directed, searching for positioned blocks enables the heuristic to identify blocks likely to contain the target content without selecting too much content. In an embodiment, the heuristic also searches for blocks with at least three visible borders because it has been found limiting a search to only those blocks formatted with four visible borders may cause an over-selection of content. In other words, because the user's attention may frequently be directed at a block with three visible borders a search limited to only those blocks with four visible borders is disadvantageous because such a criteria would generally select a node dominant to a node corresponding to the three bordered element and therefore likely select more web page content than the user desired. Lowering the block search threshold to three visible borders has been found to capitalize on the visual cues displayed borders typically provide to a user and also be a more sensitive search criteria than is a format criterion requiring four visible borders.

With the two search criteria provided in operation 325 and 327, both a table-based web page and non-table-based web page, such as one relying exclusively on CSS, may be handled by the process effectively. It should also be appreciated that the operations 325 and 327 may be performed in any order to the same effect. If a node is then identified by the processing system, at operation 328, to be a match with the format criteria, the process proceeds to operation 332. If a node satisfies neither the content criteria at operation 326 nor the format criteria at operation 328, then the process proceeds to operation 329, where the DOM tree is traversed to the next node (e.g. dominant/parent node) and the operations 325 through 329 are repeated until a match is found or the entire DOM tree is traversed, at which point the process exits the search at operation 330 and returns to operation 305.

As an example, because the target content 510 is neither a positioned block nor a block having at least three visible borders, the process proceeds to search a higher level of the DOM tree, node 585 in FIG. 2B, which is identified as an ordered list at operation 326. A criterion, at operation 326, is then determined to be satisfied, and the process to proceeds to operation 331.

In a further embodiment, where either a content criterion is met at operation 326 or a format criterion is met at operation 328, the process proceeds to operation 331 where the process determines if the size of the render object corresponding to the identified node satisfies a minimum display size threshold. Such a minimum size threshold ensures the process will select only those blocks sufficiently large that a user would want to edit them. For the embodiment depicted in process 300, implemented in an email client application, it has been found that that a minimum display size threshold of M pixels high by N pixels wide, where M is at least 25 and N is at least 25, is advantageous. Such a display size threshold prevents the process from directing edit operations toward blocks that are unlikely to contain a sufficient amount of content for the email user to be bothered with editing. While other embodiments may rely on slightly larger size thresholds, substantially larger thresholds may disadvantageously result in selecting too much content. If the size criterion is not met at operation 332, the process returns to operation 329 to further traverse the DOM tree in search of another node which matches a content or format criterion as well as the display area size threshold.

Continuing the example of FIG. 5A, the ordered list at DOM tree node 585 corresponding to the block 585, is determined to be at least 25 pixels by 25 pixels and therefore, the size threshold of operation 332 is satisfied. The process then proceeds to operation 335.

Figure 5D:
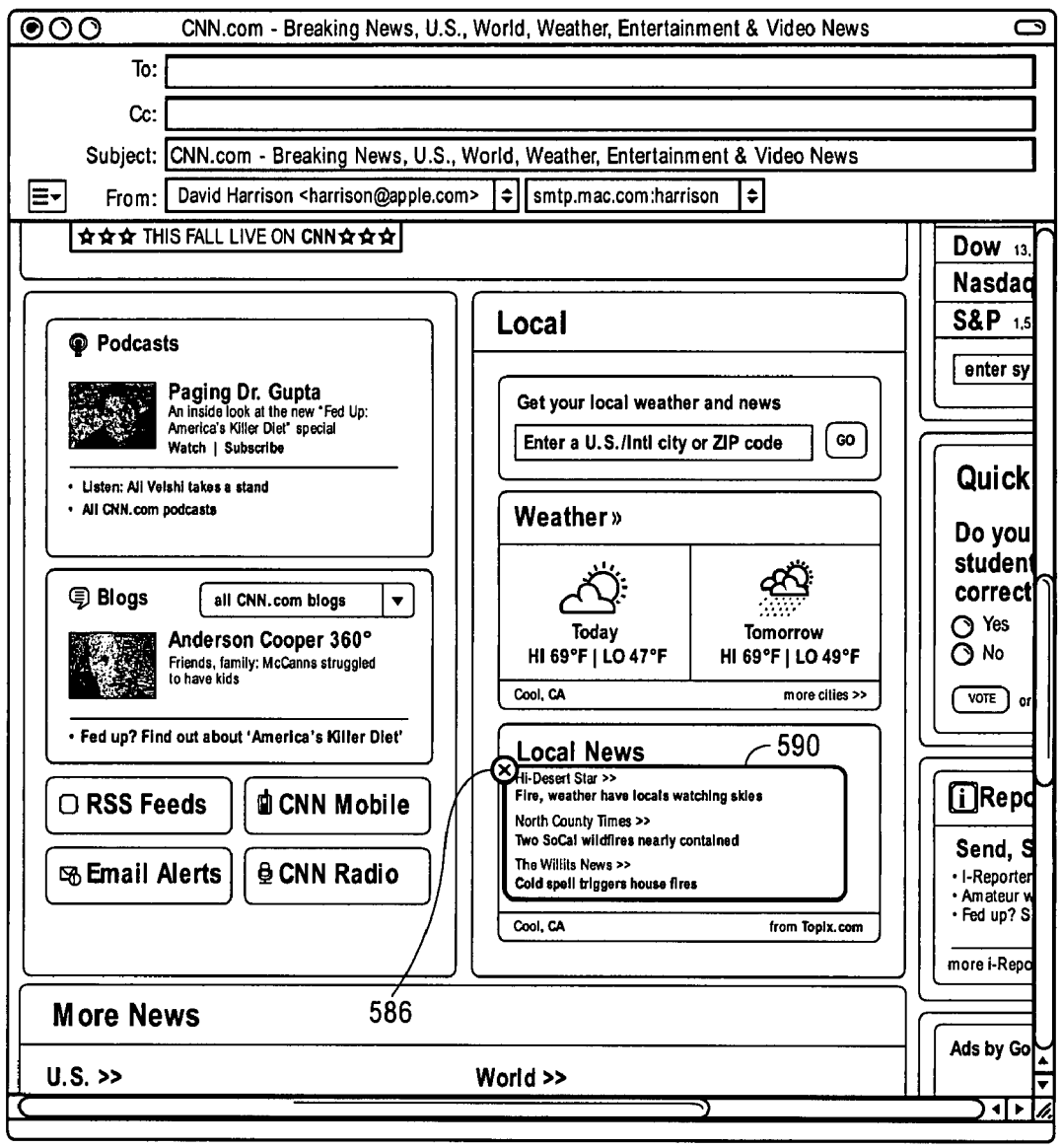
FIG. 5D shows an exemplary user interface with a portion of HTML content selected from within an email message display, according to an embodiment of the present invention.

With the size threshold met at operation 332, the process at operation 335 displays, within the application window a visual indication of the block identified by the process via operations 325 through 332. The visual indication may be any commonly employed in the art. In one embodiment, the visual indication is a highlighted box surrounding the rendition of the block within the application display window provided on a display screen to a user. FIG. 5D shows an exemplary implementation. The visual indicator 590 highlights the block corresponding to the ordered list 585 of FIG. 2A. As further shown in FIG. 5D, the visual indicator may be displayed concurrently with display of an editing interface, such as editing interface 586. The editing interface 586 and/or the visual indicator 590 may provide an intuitive interface to the user, such as a dashboard widget appearance, from which the user may operate on the selected block of content. Of course, the visual indicators of the editing interface 586 can also be displayed as menus, images, etc. The visual indicators can also be displayed at other locations (e.g. the lower right corner, etc.) within the client application display window or a separate window.

Figure 6:
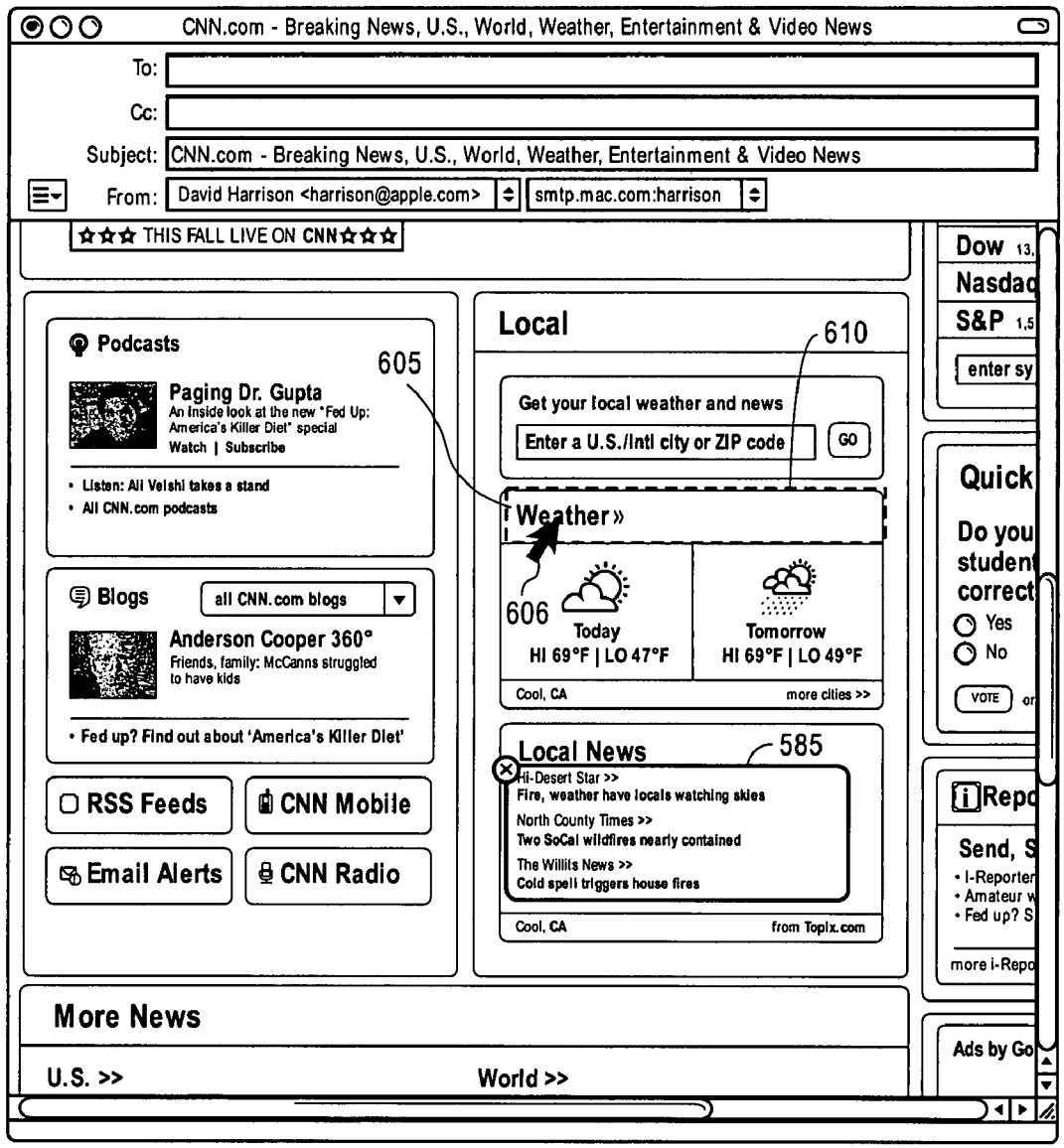
FIG. 6 shows an exemplary user interface which may be used to select a portion of HTML content from within an email message display, according to an embodiment of the present invention.
Figure 7:
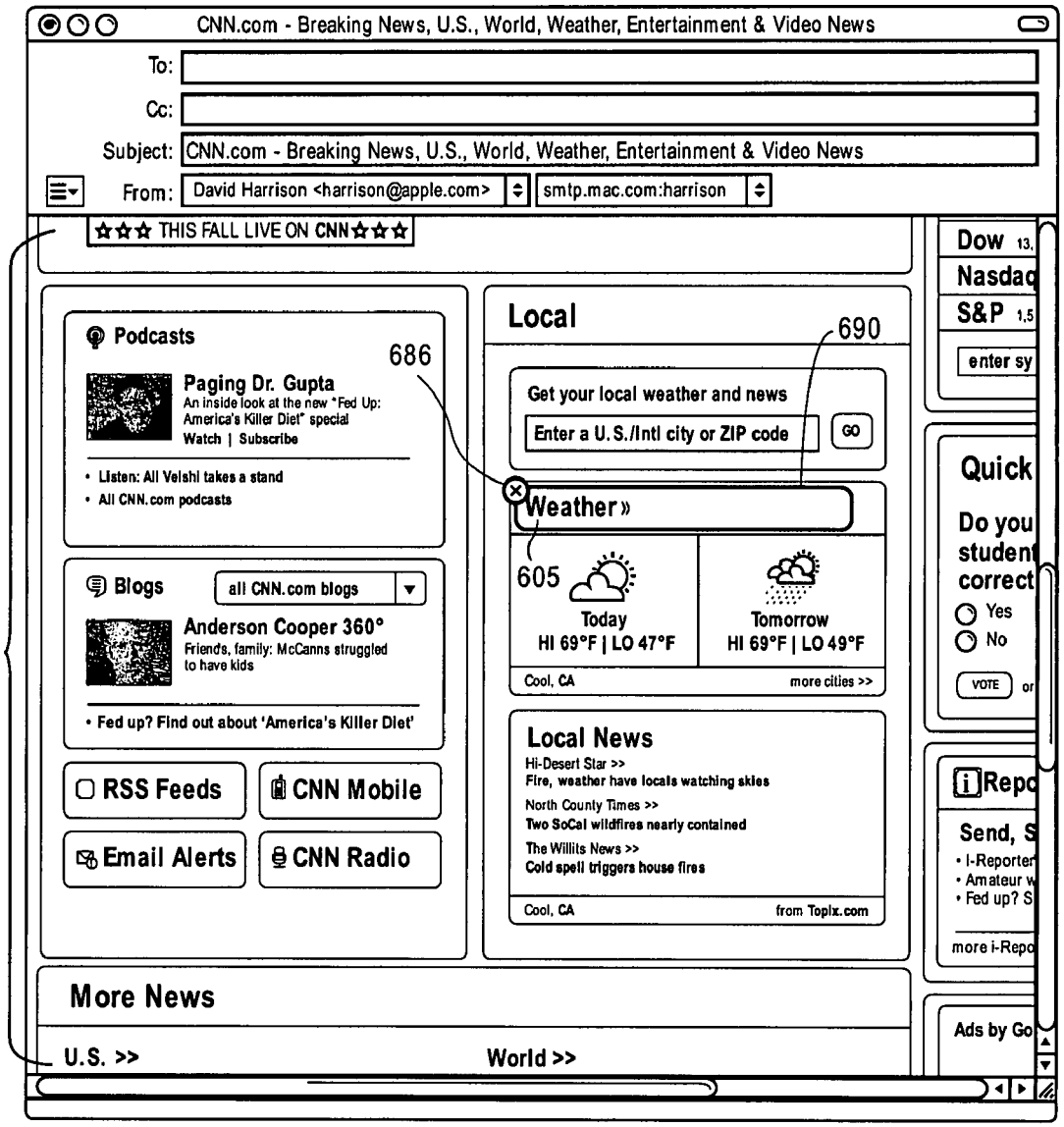
FIG. 7 shows an exemplary user interface with a portion of HTML content selected from within an email message display, according to an embodiment of the present invention.

With the visual indicator 590 displayed, the process may respond, at operation 336, to user input identifying regions outside of the visual indicator 590. For example, in response to user input selecting other web page content, such as target content 605 selected with mouse pointer 606 of FIG. 6, the process 300 proceeds to operation 340, hiding the editing interface 586, and back to operation 305. The process then determines another qualifying block wherein the user input identifies content, such as bordered element 610. That block is then identified by process 300 by repeating the operations 310 through 335, and a new visual indicator is displayed around the qualifying block containing the identified content. As shown in FIG. 7, the target content 605 is identified as being contained within the bordered element 610, a qualifying block, identified with the visual indicator 690 and the editing interface 686.

While the qualifying block is visually indicated, if input through the editing interface 686 is received, the process performs the editing operation corresponding to the input on the block. In the particular embodiment, where process 300 is performed in the context of an email application, the editing operation advantageously includes a delete operation. A delete operation is a useful operation for deconstructing the web page 405 to remove sensitive information, reduce file size, or direct an email message recipient's attention to relevant web page content.

Removing somewhat more than the minimum content required to sanitize the web page within the email message has advantages over alternative methods which require the user to successively select and delete a larger number of smaller units to more closely trim the web page content.

Hence, the criteria and thresholds for identifying the qualifying block to be operated upon, according to the present invention, are particularly well-suited for the task of quickly selecting and deleting unwanted HTML content from an email message or other client application capable of displaying web page content. Because the exemplary process 300 employing the specific combination of criteria and thresholds applied by the process in operations 325 through 332 are designed with this functionality in mind, the exemplary edit interface 686 is depicted to include only an option for deleting the highlighted block. In one such embodiment, the deletion includes deleting the DOM tree node corresponding to the qualifying block and deleting all subordinate nodes from the DOM tree. In other embodiments, however, other editing operations, such as copying, may also be performed on the qualifying block.

Figure 8:
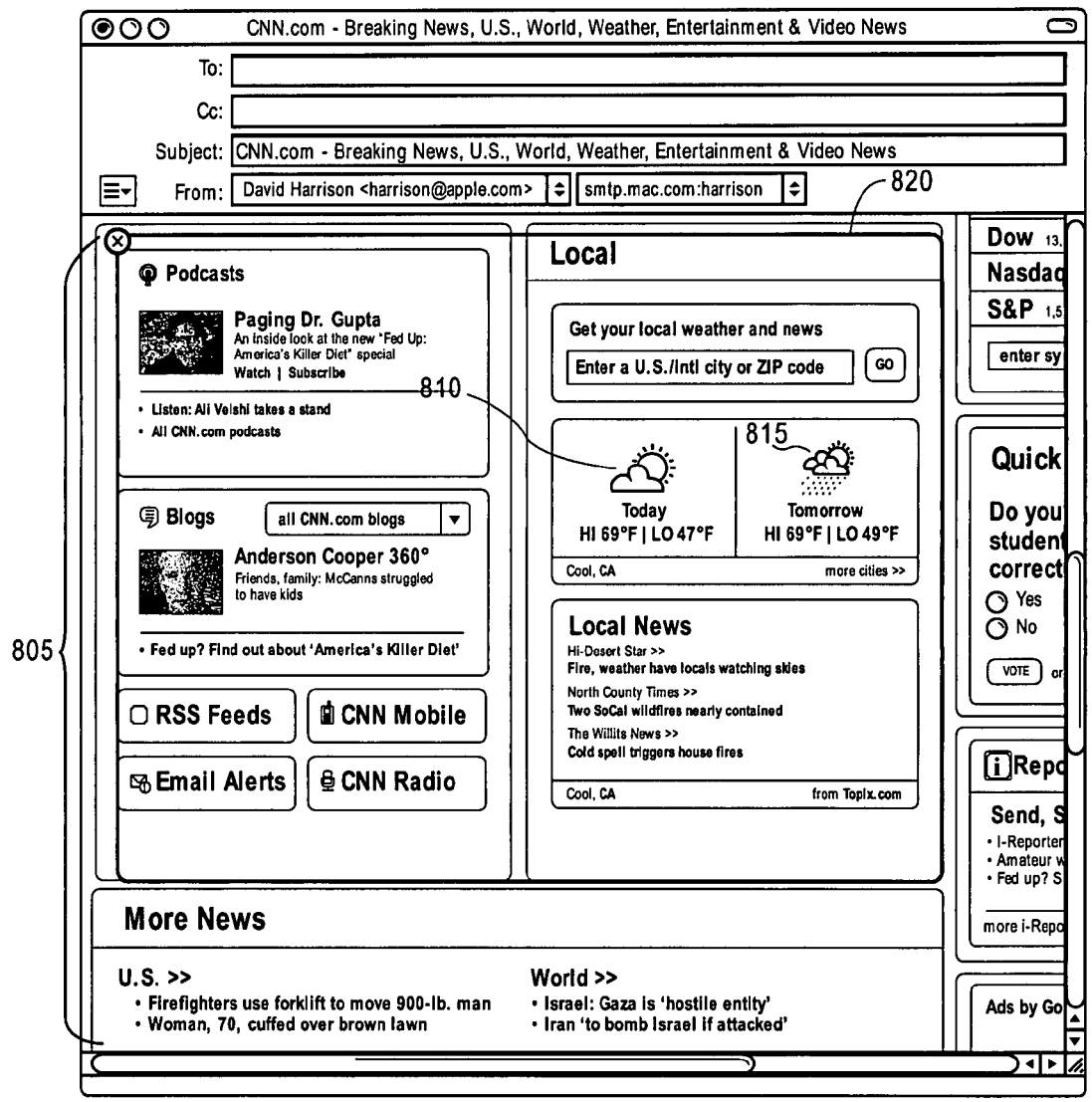
FIG. 8 shows an exemplary user interface with a portion of HTML content deleted from within an email message display, according to an embodiment of the present invention.

Following the operation 350, at operation 355, the web page 805 may be rendered to clear the deleted content contained within the qualifying block, as shown in FIG. 8. As further shown, the render at operation 355, allows remaining content, such as bordered elements 810 and 815, to flow. Such an embodiment may allow the editing to be performed discretely without changing the aesthetics of the retained content. In an alternate embodiment, deleting the block within visual indicator 690 at operation 350 is implemented by emptying the contents of the qualifying block and rendering an empty block with the same dimensions the qualifying block had prior to the deletion operation 350. In such an embodiment, the edit operation is performed to retain an empty, sized block, as a placeholder in the content flow. Such an embodiment may retain a desirable content flow.

After deletion of the block at operation 350, the process proceeds to hide the editing interface 686 and visual indicator 690. The process may then proceed to determine another qualifying block, such as block 820 in FIG. 8, beginning again at operation 310 in response to receiving another user input identifying content.

Figure 9:
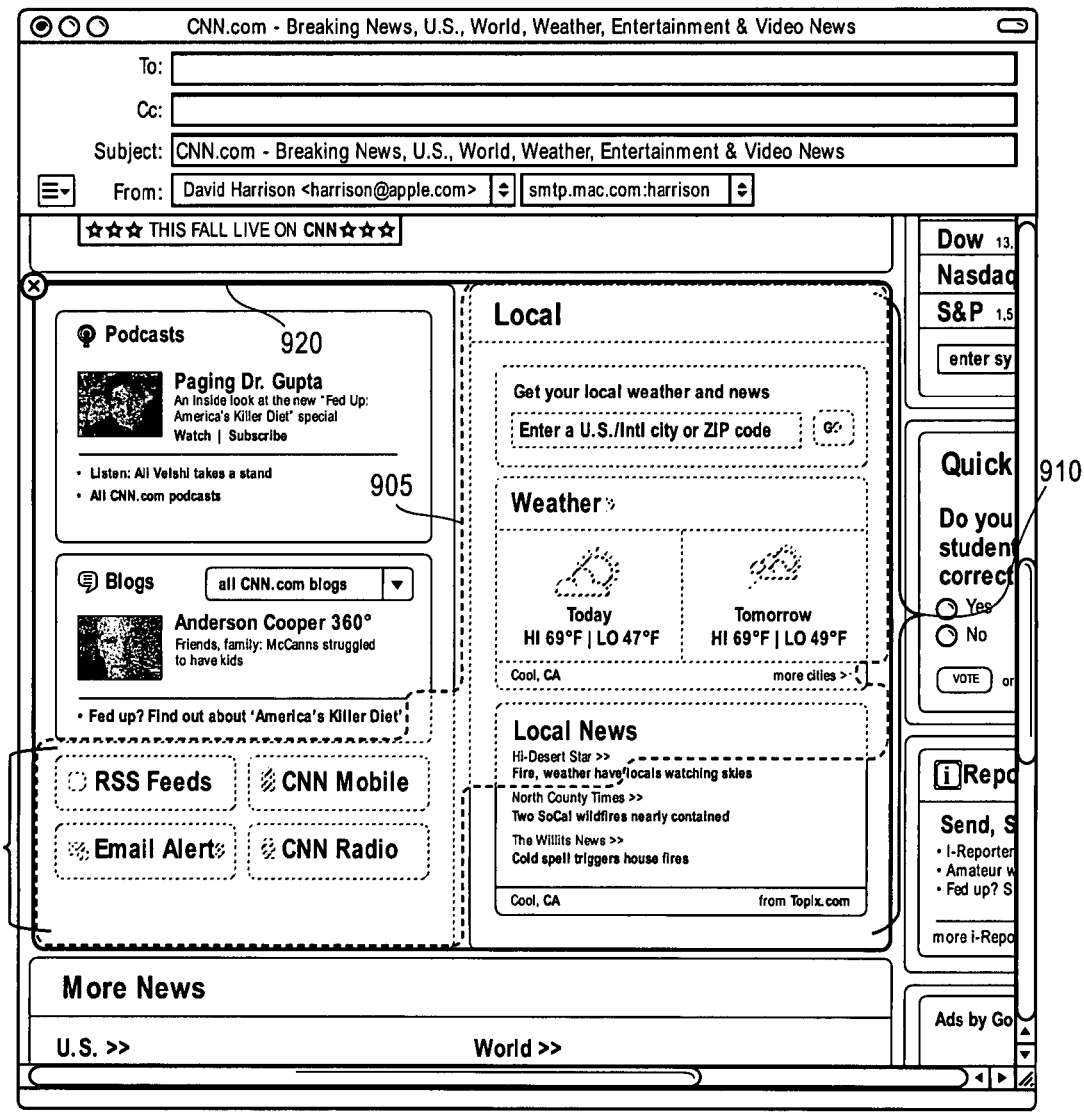
FIG. 9 shows an exemplary user interface with a portion of HTML content selected from within an email message display, according to an embodiment of the present invention.

With embodiments of block selection criteria described herein, the user can select an arbitrarily large block level merely by selecting content across multiple subordinate blocks. For example, as shown in FIG. 9, in response a user selection 905, spanning the subordinate blocks 910 and 915, the processing system identifies a dominant qualifying block containing all selected content and displays the visual indicator 920 and editing interface 921 to allow the user to continue deconstructing the web page with block deletions.

Upon completing the in-line web page editing, the exemplary process 300 may conclude with the sending the email containing the HTML content at operation 370 in response to receiving an input to send the email at operation 365 (e.g. a user clicks on a "send" button).

Figure 10:
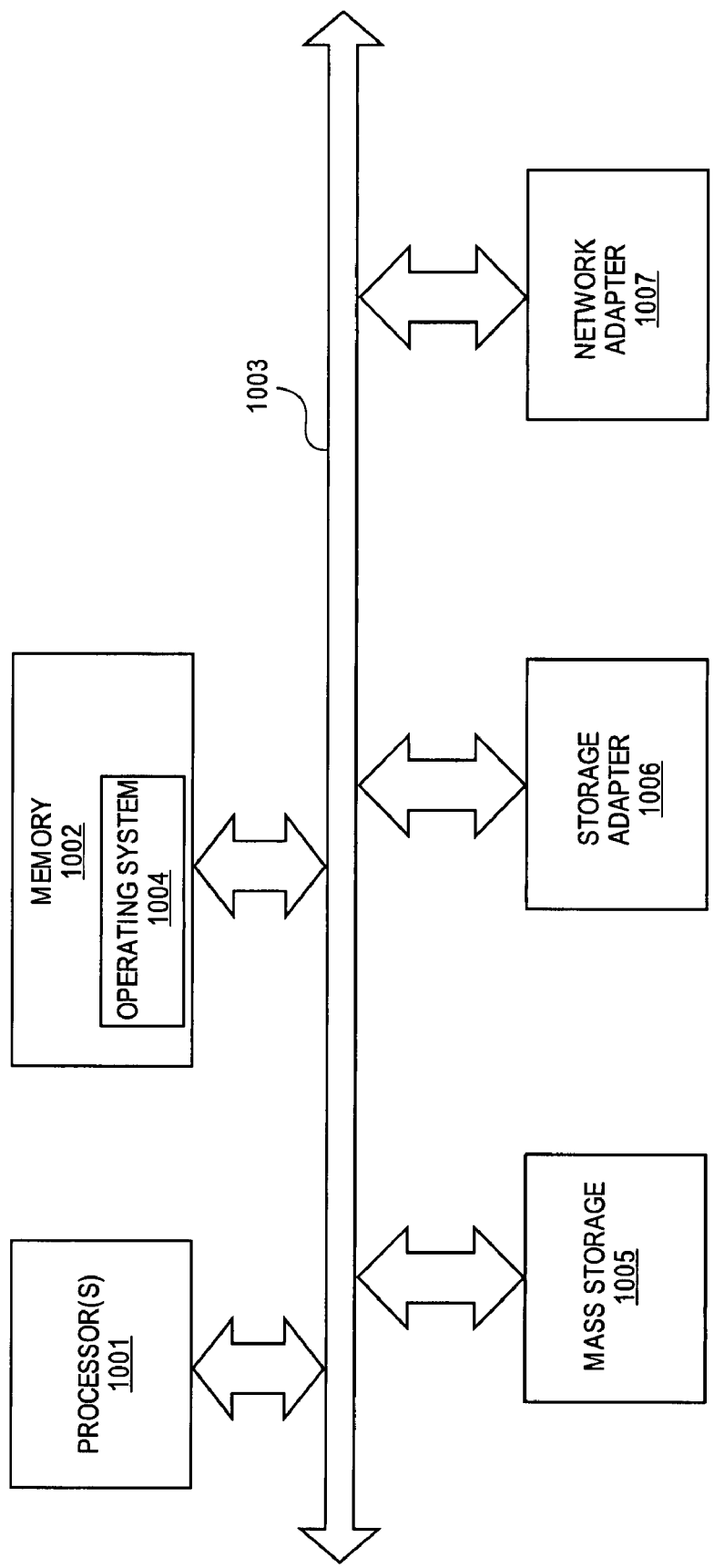
FIG. 10 is a high level block diagram illustrating a processing system which may be employed to perform an embodiment of the present invention.

FIG. 10 is a high level block diagram illustrating a processing system. The email client application or a server of the email service described in the present application can be implemented by such a processing system illustrated in FIG. 10. Certain standard and well-known components which are not germane to the present invention are not shown. The processing system includes one or more processors 1001 coupled to a bus system 1003.

The bus system 1003 in FIG. 10 is an abstraction that represents any one or more separate physical buses and/or point-to-point connections, connected by appropriate bridges, adapters and/or controllers. The bus system 1003, therefore, may include, for example, a system bus, a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The processors 1001 are the central processing units (CPUs) of the processing system and, thus, control the overall operation of processing system. In certain embodiments, the processors 1001 accomplish this by executing software stored in memory 1002. A processor 1001 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 1002 coupled to the bus system 1003. The memory 1002 represents any form of random access memory (RAM), read-only memory (ROM), flash memory, or a combination thereof. Memory 1002 stores, among other things, the operating system 1004 of the processing system.

Also connected to the processors 1001 through the bus system 1003 are a mass storage device 1005, a storage adapter 1006, and a network adapter 1007. Mass storage device 1005 may be or include any conventional medium for storing large quantities of data in a non-volatile manner, such as one or more disks. The storage adapter 1006 allows the processing system to access external storage systems. The network adapter 1007 provides the processing system with the ability to communicate with remote devices and may be, for example, an Ethernet adapter or a Fibre Channel adapter.

Memory 1002 and mass storage device 1005 store software instructions and/or data, which may include instructions and/or data used to implement the techniques introduced here. The system may include other components (e.g. input devices, such as a mouse and keyboard, and output devices such as a display).

Software to implement the technique introduced here may be stored on a machine-readable medium. A "machine-accessible medium," as the term is used herein, includes any mechanism that provides (i.e. stores and/or transmits) information in a form accessible by a machine (e.g. a computer, manufacturing tool, any device with one or more processors, etc.). For example, a machine-accessible medium includes recordable/non-recordable media (e.g. read-only memory (ROM); random access memory (RAM); magnetic disk storage media; optical storage media; flash memory devices; etc.), etc.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, particularly gracefully implementations that are to be regarded in the illustrative rather than in a restrictive sense.

What is claimed is:

1. A computer readable storage medium having executable program instructions stored thereon, which cause a data processing system to perform a method comprising:
   displaying a web page in an application window;
   receiving user input identifying a portion of the web page;
   searching a data structure associated with the web page for a qualifying element of the web page that satisfies an element format criterion; and
   displaying, within the application window, a visual indication of the qualifying element concurrently with the display of the web page.

2. A medium as in claim 1, the instructions stored thereon to cause the data processing system to perform the method further comprising displaying, concurrently with the visual indication of the element, an editing interface having user-selectable editing options for editing the element.

3. A medium as in claim 1, wherein the application window displays an email message including the web page and the program instructions are to cause the data processing system to perform the method further comprising:
editing the element in response to receiving a user input to edit the element; and sending the email message in response to receiving a user input to send the email message.

4. The medium of claim 1, wherein the element format criterion is selected from the group consisting of: a positioned element, an element having three visible borders, and an element having four visible borders; and
wherein the program instructions are to cause the data processing system to perform the method further comprising searching the data structure for a qualifying element of the web page that satisfies an element content criterion selected from the group consisting of: a table, an ordered list and an unordered list.

5. A medium as in claim 1, wherein the program instructions are to cause the data processing system to perform the method further comprising searching the data structure for a qualifying element of the web page that satisfies a minimum display area criterion, wherein the display area is the display area the element occupies.

6. A computer readable storage medium having executable program instructions stored thereon, which cause a data processing system to perform a method comprising:
displaying markup language content in an application display window;
determining from a data structure corresponding to a portion of the markup language content, the portion identified by a received user input;
searching the data structure for a qualifying element matching one in a set of block elements or one in a set of block element formats until each in the sets is tested or a match is found;
displaying, within the application display window, a visual indication of the qualifying element concurrently with the markup language content.

7. A medium as in claim 6, wherein the markup language selected from the group consisting of: HTML and XML and wherein the data structure comprises a DOM tree.

8. A medium as in claim 6, the instructions stored thereon to cause the data processing system to perform the method further comprising:
determining if the rendition of the qualifying element comprises a display area of at least a minimum threshold within the display window; and if not,
repeating the searching of the data structure until a qualifying element meeting both the matching criteria and the minimum display area criteria is found or the root reached, wherein the searching begins at a first node of the data structure associated with the identified portion identified by a received user input and moves toward the root of the data structure with each repetition.

9. A medium as in claim 6, wherein the set of block elements includes at least one of: a table, an ordered list or an unordered list and wherein the set of block element formats includes at least one of: a positioned element, a block element having three visible borders or a block element having four visible borders.

10. A medium as in claim 6, wherein the set of block elements includes at least two of: a table, an ordered list or an unordered list and wherein the set of block element formats includes at least two of: a positioned element, a block element having three visible borders or a block element having four visible borders.

11. A medium as in claim 6, wherein the set of block elements includes three of: a table, an ordered list or an unordered list and wherein the set of block element formats includes three of: a positioned element, a block element having three visible borders or a block element having four visible borders.

12. A medium as in claim 6, the instructions stored thereon to cause the data processing system to perform the method further comprising displaying, concurrently with the visual indication of the qualifying element, an editing interface having user-selectable editing options for editing the qualifying element.

13. A medium as in claim 6, wherein the threshold display area is M pixels high by N pixels wide, wherein M is equal to 25 and N is equal to 25.

14. A medium as in claim 6, further comprising:
editing all markup language content contained within the visual indication of the qualifying element in response to receiving an input via the editing interface; and wherein the application is an email client application, causing an email containing at least the un-edited markup language content to be sent in response to receiving a command to send the email.

15. A medium as in claim 14, further comprising:
deleting the qualifying element and all nodes in the data structure that are subordinate to the qualifying element, wherein the input received is to delete the markup language content contained within the visual indication of the qualifying element;
removing the visual indication; and
flowing the remainder of the markup language content to fill the display region from which the content was deleted.

16. A medium as in claim 14, the instructions stored thereon to cause the data processing system to perform the method further comprising:
displaying, after deleting the markup language content contained within the qualifying element, the qualifying element with the same dimensions the qualifying element had prior to deleting the content, as a placeholder in the content flow, wherein the input received is to delete of the content contained within the visual indication of the qualifying element.

17. A medium as in claim 6, wherein displaying a visual indication of the block further comprises:
displaying a highlighted box around the rendition of the qualifying element; and
displaying the editing interface within the applications display window proximate to, and concurrently with, the highlighted box.

18. A medium as in claim 6, further comprising:
copying the qualifying element and all elements in the data structure that are subordinate to the qualifying element, wherein the input received is to copy the markup language content contained within the visual indication of the qualifying element.

19. A medium as in claim 6, the instructions stored thereon to cause the data processing system to perform the method further comprising:

removing the visual indication of the qualifying element upon receiving user input locating the cursor outside of the visual indication of the qualifying element.

20. A computer implemented method comprising:
displaying markup language content in an application display window;
determining form a data structure corresponding to a portion of the markup language content, the portion identified by a received user input;
searching the data structure for a qualifying element matching one in a set of block elements or one in a set of block element formats until each in the sets is tested or a match is found;
displaying, within the application display window, a visual indication of the qualifying element concurrently with the markup language content.

21. A method as in claim 20, wherein the set of block elements includes at least two selected from the group consisting of: a table, an ordered list and an unordered list and wherein the set of block element formats includes at least two selected from the group consisting of: a positioned element, a block element having three visible borders and a block element having four visible borders.

22. A method as in claim 20, wherein the threshold display area is M pixels high by N pixels wide, wherein M is equal to 25 and N is equal to 25.

23. A data processing system comprising:
a means for displaying markup language content in an application display window;
a means for determining form a data structure corresponding to a portion of the markup language content, the portion identified by a received user input;
a means for searching the data structure for a qualifying element matching one in a set of block elements or one in a set of block element formats until each in the sets is tested or a match is found;
a means for displaying, within the application display window, a visual indication of the qualifying element concurrently with the markup language content.

24. A processing system as in claim 23, wherein the set of block elements includes at least two selected from the group consisting of: a table, an ordered list and an unordered list and wherein the set of block element formats includes at least two selected from the group consisting of: a positioned element, a block element having three visible borders and a block element having four visible borders.

25. A processing system as in claim 23, further comprising:
a means for deleting the qualifying element and all nodes in the data structure that are subordinate to the qualifying element, wherein the input received is to delete of the markup language content contained within the visual indication of the qualifying element.

* * * * *

UNITED STATES PATENT AND TRADEMARK OFFICE
CERTIFICATE OF CORRECTION

| | |
|---|---|
| PATENT NO. | : 7,900,149 B2 |
| APPLICATION NO. | : 11/924548 |
| DATED | : March 1, 2011 |
| INVENTOR(S) | : Timothy Gene Hatcher et al. |

It is certified that error appears in the above-identified patent and that said Letters Patent is hereby corrected as shown below:

In column 3, line 33, after "5A" insert -- . --.

In column 5, line 53, after "render tree" insert -- 560 may be similar to the DOM tree 550, both the render tree and DOM tree can also --.

Signed and Sealed this
Fifteenth Day of November, 2011

David J. Kappos
*Director of the United States Patent and Trademark Office*